Figure 1:
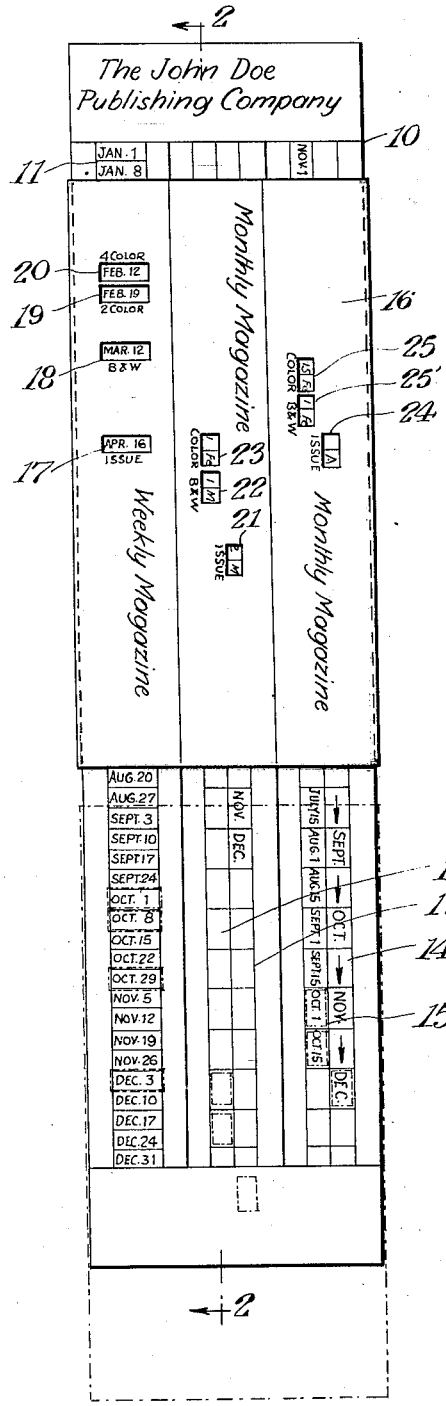

Dec. 23, 1930. H. J. HUENE 1,785,866
CHART FOR SUBMITTING ADVERTISING MATTER
Filed Dec. 2, 1927   2 Sheets-Sheet 1

Inventor,
Howard J. Huene,
By his Attorneys.
Hoguet & Neary.

Dec. 23, 1930.  H. J. HUENE  1,785,866
CHART FOR SUBMITTING ADVERTISING MATTER
Filed Dec. 2, 1927  2 Sheets-Sheet 2
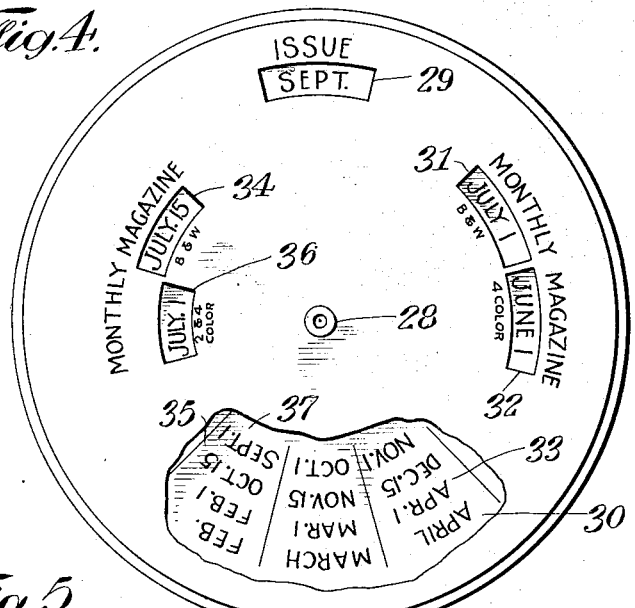
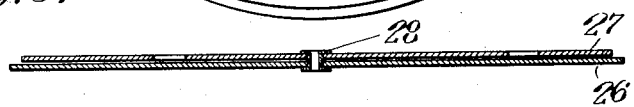
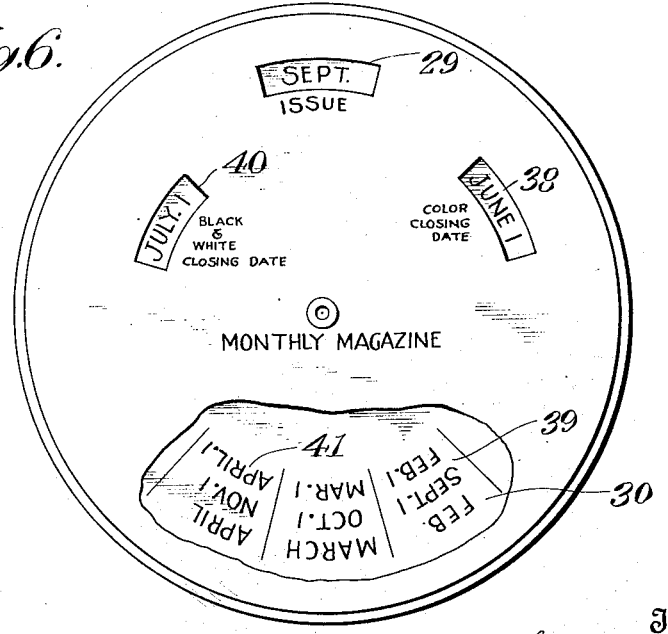
Inventor,
Howard J. Huene,
By his Attorneys,
Hoguet & Neary.

Patented Dec. 23, 1930

1,785,866

UNITED STATES PATENT OFFICE

HOWARD J. HUENE, OF BROOKLYN, NEW YORK

CHART FOR SUBMITTING ADVERTISING MATTER

Application filed December 2, 1927. Serial No. 237,150.

My invention relates to improvements in a chart for indicating when advertising matter is to be submitted for publication on a given day. Periodical publications usually have a date on or before which advertising matter must be submitted to appear in a certain issue of the publication. This prior date varies with the nature of the advertising matter. If it is plain black and white, less time is required prior to publication; and if it is in colors more time is required; and if there are several colors, more time is required than where there are but two. In submitting advertising matter for publication on given dates of various periodicals, it requires careful attention and considerable time to avoid making mistakes which may lead to confusion and general difficulty. My invention is intended to produce a simple chart having indicia thereon so that when the chart is set to indicate a given issue date of a publication, other indicia will automatically indicate the dates on which various advertisements must be submitted in order to appear on the date of issue. The simplest way of carrying out this idea is to have plates or members movable with relation to each other, one bearing a list of issue dates and if necessary an auxiliary list of dates on which advertising matter must be submitted, and the other member can be provided with sight openings which are arbitrarily placed so that when one opening is opposite an issue date, other openings will be opposite dates on which various advertising matter must be submitted. It will be seen from the description which follows that other indicia can be substituted for the sight openings, but this is the preferred arrangement, and it makes for simplicity, ease of use, and certainty of result.

Reference is to be had to the accompanying drawings forming a part of this specification, in which similar reference characters indicate corresponding parts in all the views.

Figure 2:
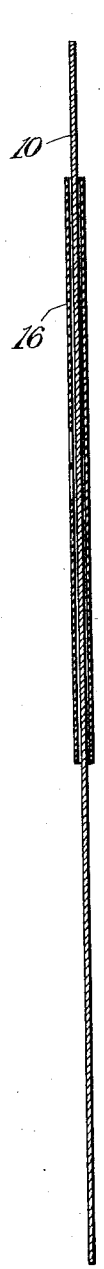
Figure 3:
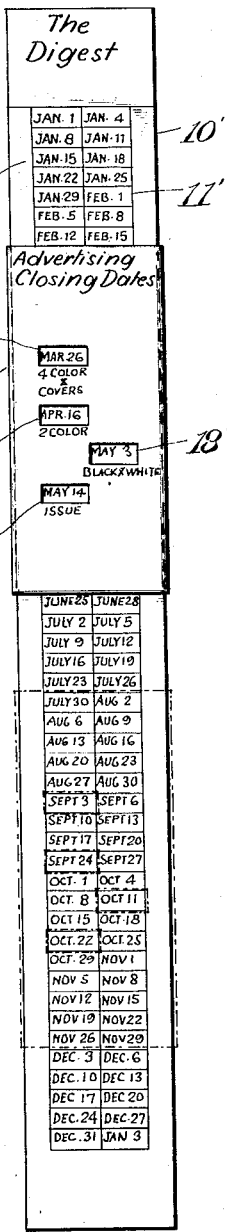

Figure 1 is a plan view of one form of the chart embodying my invention, showing it as applicable to a weekly publication and to two monthly publications, Figure 2 is a section on the line 2—2 of Figure 1, Figure 3 is a view similar to Figure 1 of a slightly modified arrangement of the chart, Figure 4 is a plan view with parts broken away showing the chart with circularly arranged tables, Figure 5 is a cross section of the structure shown in Figure 4, and Figure 6 is a slightly modified form of the type of chart shown in Figure 4.

The chart can be easily adapted to one publication, or often it can be adapted to several publications, and particularly where these are issued by the same publishing company. As shown in Figure 1 the chart comprises a base member 10 which can conveniently be a piece of cardboard, and on this is arranged a list or table of issue dates 11 for a given publication. As illustrated this is a weekly publication. In the next table to the right is a column 12 of the months of the year, and just to the left of it is a column 13 in which the dates for submitting advertising matter appear, and at the right hand of the member 10 is a third table having a column 14 of issue dates and a column 15 of the dates for submitting advertising matter. Movable up and down on the plate or member 10 is a second member 16 which can conveniently be a sleeve slidable on the member 10, and this carries indicia for indicating the issue dates of publications represented by the chart, and the dates for submitting advertising matter. The simplest way is to have sight openings through the member 16 which will register with the appropriate matter in the column behind it. For example, the part of the member 16 opposite the column 11 has a sight opening 17 marked "Issue," and this can be placed opposite any given issue. Spaced apart from this opening 17 and in columnar arrangement, is a second opening 18 which is placed with relation to the opening 17 so that when the opening 17 appears opposite a given issue date, the opening 18 will appear opposite the date on which the advertising matter must be submitted if it is to issue on a date shown in the opening 17, and if the matter is plain black and white.

In the present instance the chart will show from its position that the issue date of the periodical is April 16th, and the sight opening 18 will show that black and white advertising matter for publication on April 16th must be filed or submitted on or before March 12th, and as a further indication, and to facilitate quick use, the marks B & W appear near the opening 18 to show that it refers to black and white. Another opening 19 appears above the opening 18 and this is marked "2 color," and is spaced with relation to the issue opening 17 to indicate the date on which a two color advertisement must be submitted for appearance on the indicated issue date. In the present instance the date February 19th appears, and a third opening 20 adapted for four color indication and correspondingly marked will appear opposite the date on which an advertisement in four colors must be submitted.

Obviously this arrangement might be carried out to a greater extent, but the example given and clearly illustrated shows the use of the invention, and from the description it will be seen that if the chart is properly made and used, the member 16 can be placed so that the issue opening 17 will appear opposite a given issue date, and the other openings will indicate the dates on which the different kinds of advertising matter must be submitted for publication on said issue date. It will be seen, therefore, that by using the chart the matter of publication and submission can be immediately determined without danger of mistake.

The middle part of the chart shown in Figure 1 is adapted to a monthly publication, and here the issue opening 21 appears opposite the month numbers in the column 12, while the black and white and color openings 22 and 23 appear opposite another row of dates in the column 13, and when the chart is used in connection with this middle portion, the parts on the two sides are ignored. Likewise the chart when used in the monthly magazine at the right hand is used independently of that part of the chart relating to the two other publications. As here shown the issue opening 24 appears opposite the months in the column 14, and the other openings 25 and 25' appear opposite the dates in the column 15, so that when the issue opening 24 is placed opposite a definite issue date, the other openings 25 and 25' will appear opposite the dates on which the advertising matter must be submitted.

In Figure 3 I have shown a slightly modified arrangement but which is substantially like that described. This illustrates the fact that the dates cannot always be conveniently placed in a single column. As here shown the column 11 indicates the issue dates as already described, and the column 11' is added to facilitate easy making up the chart, and to carry dates which in some instances will be the dates for submitting advertising matter.

The chart shown in Figure 3 has a sliding member 16' thereon, and the openings 17, 19 and 20 are as already described, and are used in the same way as already referred to, but the sight opening 18' appears opposite the column 11' so that the black and white matter must be submitted on the date indicated in the opening 18'. This Figure 3 of the chart makes it clear that the date tables can be a plurality of columns if desired.

Figures 4 to 6 illustrate the idea already set forth but in a slightly modified shape in which the base member 26 has a member 27 which revolves thereon instead of sliding, but the effect is the same. The parts can be pivoted together in any convenient way, as for example by an eyelet 28. The movable member 27 has an issue opening 29 thereon which registers with the outer circularly arranged dates in the row 30. The sight openings 31 and 32 are for one monthly magazine, and the sight openings 34 and 36 are for another monthly magazine. The openings 31 and 32 register with a row of dates 33 which are concentric with the row 30, and the sight openings are appropriately marked to indicate black and white matter and four color matter. When the issue date appears in the sight opening 29, these openings 31 and 32 will indicate the dates on or before which the various advertising matter must be submitted. The opening 34 for use on the magazine referred to on the left hand of the chart, registers with a row 35 of the dates which can be concentric with the other rows mentioned, and through this opening will appear the date for submitting black and white advertising matter, but the opening 36 will appear opposite the inner row 37 of dates and indicating the date on which matter in color must be submitted.

In Figure 6 the same idea is carried out, and this is made for a single monthly magazine. The sight opening 29 is made to appear as already described over the issue date, the closing date opening 38 will appear opposite one of the dates in the column or row 39, and the black and white closing sight opening 40 will appear opposite one of the dates in the row 41.

The above description and illustrations in connection therewith will make the simplicity of the chart apparent, and the ease and accuracy of operation will also be clearly seen. It will be further noticed that the particular arrangement of dates and sight openings can be changed to suit various publications, but that the essential thing is to have a table of issue dates for a publication, and a movable member with indicia thereon which will indicate the issue date and the relative dates for submitting advertising matter of various kinds.

The chart can be worked in the reverse way from that described and in other ways without affecting the invention. Suppose a date is known when an advertisement can be made ready for a certain periodical. The next step would be to know the earliest issue date in which the advertisement can be inserted. By sliding the member 16 so that the known date appears in the advertisement opening, the date in the issue opening will indicate the earliest appearance date.

A working example is shown in Figure 3. An advertiser finds he can have a four color advertisement ready by March 26th. By sliding the member 16 so that the four color opening 20 shows March 26th, the issue opening 17 will automatically show May 14th. This is the issue in which four color advertising can be inserted if ready on or before March 26th.

I claim:—

1. A chart of the kind described comprising a member having a plurality of series of dates thereon, all the dates of one series being adapted to serve alternatively as issue dates and as advertising-submission dates, a second member movable with respect to the first member having indicia thereon so disposed that when one part of the index indicates an issue date the other parts will indicate dates for submitting advertisement, all nonpertinent dates adjacent those desired being hidden from the eye of the observer.

2. A chart of the kind described comprising a member having a plurality of series of dates thereon, all the dates of one series being adapted to serve alternatively as issue dates and as advertising-submission dates, a second member movable with respect to the first member, having a plurality of sight openings thereon so disposed that when one sight opening is set against the issue date, the other openings will indicate the dates for submission of various types of advertising matter.

In testimony whereof, I have signed my name to this specification this 29th day of October, 1927.

HOWARD J. HUENE.